US010529328B2

(12) United States Patent
Singh

(10) Patent No.: US 10,529,328 B2
(45) Date of Patent: Jan. 7, 2020

(54) PROCESSING SPEECH SIGNALS IN VOICE-BASED PROFILING

(71) Applicant: CARNEGIE MELLON UNIVERSITY, Pittsburgh, PA (US)

(72) Inventor: Rita Singh, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 101 days.

(21) Appl. No.: 15/739,085

(22) PCT Filed: Jun. 22, 2016

(86) PCT No.: PCT/US2016/038653
§ 371 (c)(1),
(2) Date: Dec. 21, 2017

(87) PCT Pub. No.: WO2016/209888
PCT Pub. Date: Dec. 29, 2016

(65) Prior Publication Data
US 2018/0190284 A1 Jul. 5, 2018

Related U.S. Application Data

(60) Provisional application No. 62/231,015, filed on Jun. 22, 2015.

(51) Int. Cl.
*G10L 17/00* (2013.01)
*G10L 15/22* (2006.01)
(Continued)

(52) U.S. Cl.
CPC .............. *G10L 15/22* (2013.01); *G10L 15/02* (2013.01); *G10L 15/04* (2013.01); *G10L 15/30* (2013.01);
(Continued)

(58) Field of Classification Search
CPC ................................. G10L 17/26; G10L 15/30
See application file for complete search history.

(56) References Cited

U.S. PATENT DOCUMENTS 6,665,644 B1 * 12/2003 Kanevsky ............... G10L 17/26
704/246
7,231,019 B2 * 6/2007 Pascovici ................ G10L 17/04
379/88.02
(Continued)

FOREIGN PATENT DOCUMENTS

WO WO2015/017303 2/2015
WO WO2016/209888 12/2016

OTHER PUBLICATIONS

Singh, Rita, Joseph Keshet, and Eduard Hovy. "Profiling hoax callers." 2016 IEEE Symposium on Technologies for Homeland Security (HST). IEEE, May 10, 2016. (Year: 2016).*
(Continued)

*Primary Examiner* — Jialong He
(74) *Attorney, Agent, or Firm* — Fish & Richardson P.C.

(57) ABSTRACT

This document describes a data processing system for processing a speech signal for voice-based profiling. The data processing system segments the speech signal into a plurality of segments, with each segment representing a portion of the speech signal. For each segment, the data processing system generates a feature vector comprising data indicative of one or more features of the portion of the speech signal represented by that segment and determines whether the feature vector comprises data indicative of one or more features with a threshold amount of confidence. For each of a subset of the generated feature vectors, the system processes data in that feature vector to generate a prediction of a value of a profile parameter and transmits an output responsive to machine executable code that generates a
(Continued)

visual representation of the prediction of the value of the profile parameter.

18 Claims, 7 Drawing Sheets

(51) Int. Cl.
| | |
|---|---|
| G10L 25/51 | (2013.01) |
| G10L 17/02 | (2013.01) |
| G10L 17/26 | (2013.01) |
| G10L 25/66 | (2013.01) |
| G10L 15/02 | (2006.01) |
| G10L 15/04 | (2013.01) |
| G10L 15/30 | (2013.01) |
| G10L 25/90 | (2013.01) |
| G10L 25/63 | (2013.01) |

(52) U.S. Cl.
CPC .............. *G10L 17/02* (2013.01); *G10L 17/26* (2013.01); *G10L 25/51* (2013.01); *G10L 25/66* (2013.01); *G10L 25/90* (2013.01); G10L 25/63 (2013.01)

(56) References Cited

U.S. PATENT DOCUMENTS

| | | | |
|---|---|---|---|
| 8,391,445 B2* | 3/2013 | Hoblit | H04M 1/57 370/352 |
| 8,432,897 B2* | 4/2013 | Bangor | H04L 29/06027 370/352 |
| 2002/0156626 A1 | 10/2002 | Hutchison | |
| 2003/0204394 A1 | 10/2003 | Garudadri et al. | |
| 2006/0122834 A1* | 6/2006 | Bennett | G10L 15/1822 704/256 |
| 2008/0235016 A1* | 9/2008 | Paul | G06N 20/00 704/246 |
| 2008/0235019 A1* | 9/2008 | Witzman | G10L 17/26 704/251 |
| 2008/0298562 A1* | 12/2008 | Ju | G10L 15/005 379/88.18 |
| 2009/0313018 A1 | 12/2009 | Degani et al. | |
| 2010/0004926 A1 | 1/2010 | Neoran et al. | |
| 2010/0105426 A1* | 4/2010 | Jaiswal | H04M 1/575 455/556.1 |
| 2010/0121638 A1 | 5/2010 | Pinson et al. | |
| 2011/0208524 A1 | 8/2011 | Haughay | |
| 2012/0221336 A1* | 8/2012 | Degani | G10L 15/06 704/250 |
| 2013/0109358 A1 | 5/2013 | Balasubramaniyan et al. | |
| 2013/0268273 A1* | 10/2013 | Chen | G10L 17/26 704/249 |
| 2013/0297297 A1 | 11/2013 | Guven | |
| 2014/0188471 A1 | 7/2014 | Haughay | |
| 2015/0193718 A1* | 7/2015 | Shaburov | G06Q 10/06395 705/7.39 |
| 2018/0130473 A1* | 5/2018 | Odinak | G06F 21/32 |
| 2018/0342250 A1* | 11/2018 | Cohen | G10L 17/04 |

OTHER PUBLICATIONS

Singh, Rita et al. "Forensic anthropometry from voice: an articulatory-phonetic approach"; MIPRO 2016, May 30-Jun. 3, 2016, Opatija, Croatia (Year: 2016).*
International Search Report and Written Opinion in corresponding Application No. PCT/US2016/038653, dated Sep. 7, 2016, pages.

R. C. Maher, "Overview of audio forensics," in Intelligent Multimedia Analysis for Security Applications, pp. 127-144, Springer, 2010.
G. S. Morrison and Michael Hoy, "What did bain really say? a preliminary forensic analysis of the disputed utterance based on data, acoustic analysis, statistical models, calculation of likelihood ratios, and testing of validity," in Proc. 46th Audio Engineering Society Conference on Audio Forensics: Recording, Recovery, Analysis, and Interpretation, (Denver, Colorado, USA), pp. 203-207, 2012.
A. Vogel, "Vocal acoustic biomarkers of depression severity and treatment response," Biological Psychiatry, vol. 70:7, pp. 580-587, 2012.
S. D'Arcy, V. Rapcan, and R. Reilly, "Acoustic and temporal analysis of speech: A potential biomarker for schizophrenia," Medical Engineering and Physics, vol. 32, No. 9, pp. 1074-1079, 2010.
L. Hack, "Voice as biomarker: Using vocalizations to screen for autism," Contemporary Pediatrics, Apr. 2014, p. 1.
Sadaoki Furui. An overview of speaker recognition technology. In *Proceedings of the ESCA Workshop on Automatic Speaker Recognition, Identification and Verification*, pp. 1-9, 1994.
G.S. Morrison, "Forensic voice comparison and the paradigm shift," Science and Justice 49 (2009) 298-308.
G. S. Morrison, "Forensic voice comparison," in Expert Evidence (I. Freckelton and H. Selby, eds.), ch. 99, Sydney, Australia: Thomson Reuters, pp. 1-106, 2010.
K. Amino, T. Osanai, H. Makinae, and T. Arai, "Historical and procedural overview of forensic speaker recognition as a science," in Forensic Speaker Recognition (A. Neustein and H. A. Patil, eds.), pp. 3-20, New York, USA: Springer, 2012.
E. Gold and P. French, "International practices in forensic speaker comparison," International Journal of Speech, Language, and the Law, vol. 18, pp. 293-307, 2011.
N. N. Markel, M. Meisels, and J. E. Houck, "Judging personality from voice quality.," The Journal of Abnormal and Social Psychology, vol. 69, No. 4, p. 458, 1964.
S. E. Linville and J. Rens, "Vocal tract resonance analysis of aging voice using long-term average spectra," Journal of Voice, vol. 15, No. 3, pp. 323-330, 2001.
D. Rendall, J. R. Vokey, and C. Nemeth, "Lifting the curtain on the wizard of oz: biased voicebased impressions of speaker size.," Journal of Experimental Psychology: Human Perception and Performance, vol. 33, No. 5, p. 1208-1219, 2007.
C. E. Williams and K. N. Stevens, "Emotions and speech: Some acoustical correlates," The Journal of the Acoustical Society of America, vol. 52, No. 4B, pp. 1238-1250, 1972.
C. R. Hodges-Simeon, S. J. Gaulin, and D. A. Puts, "Different vocal parameters predict perceptions of dominance and attractiveness," Human Nature, vol. 21, No. 4, pp. 406-427, 2010.
R. M. Krauss, R. Freyberg, and E. Morsella, "Inferring speakers' physical attributes from their voices," Journal of Experimental Social Psychology, vol. 38, pp. 618-625, 2002.
K. Pisanski, P. J. Fraccaro, C. C. Tigue, J. J. M. O'Connor, and D. R. Feinberg, "Return to oz: Voice pitch facilitates assessments of men's body size," Journal of Experimental Psychology. Human Perception and Performance, pp. 1-18, Jun. 2014.
W. A. van Dommelen and B. H. Moxness, "Acoustic parameters in speaker height and weight identification: sex-specific behaviour," Language and speech, vol. 38, No. 3, pp. 267-287, 1995.
T. Ganchev, I. Mporas, and N. Fakotakis, Audio features selection for automatic height estimation from speech, pp. 81-90. Springer, 2010.
I. Mporas and T. Ganchev, "Estimation of unknown speaker's height from speech," International Journal of Speech Technology, vol. 12, No. 4, pp. 149-160, 2009.

* cited by examiner

PROCESSING SPEECH SIGNALS IN VOICE-BASED PROFILING

CROSS-REFERENCE TO RELATED APPLICATIONS

This application is a § 371 National Stage Application of PCT/US2016/038653, filed Jun. 22, 2016, which, in turn, claims the benefit of priority under 35 U.S.C. § 119(e) to provisional U.S. Patent Application No. 62/231,015, filed Jun. 22, 2015, the entire contents of each are incorporated by reference.

BACKGROUND

A human voice sound is produced by a physical mechanism that involves air-flow from the lungs of the individual through the structures that comprise the vocal tract of the individual. The production of the human voice sound is a complex nonlinear process that depends on the shape of the human vocal tract. The vocal tract shape is dependent on a bone structure, body size, race, age, and so forth of an individual. The relative shape of the vocal tract resonant cavities, the vocal tract tissue structure and density, and other factors such as lung capacity (controlling air-flow dynamics through the vocal tract), inertia of movement of the vocal apparatus etc. can also contribute to the sound of the human voice. The combination of these complex factors result in voice sounds that can be unique to the speaker.

SUMMARY

This document describes a detection system front end server that routes a speech signal to one or more processing devices that generate a response to the speech signal; and a segmentation server that includes the one or more processing devices and that processes the speech signal to segment the data into a plurality of segments, with each segment representing a portion of the speech signal, and with the segmentation server further performing operations comprising: for each segment, generating a feature vector comprising data indicative of one or more features of the portion of the speech signal represented by that segment; and determining whether the feature vector comprises data indicative of one or more features with a threshold amount of confidence; and for each of a subset of the generated feature vectors, processing data in that feature vector to generate a prediction of a value of a profile parameter, with the subset comprising one or more feature vectors determined to have one or more features with a threshold amount of confidence, wherein the segmentation server generates and transmits an output responsive to machine executable code that generates a visual representation of the prediction of the value of the profile parameter, and wherein the detection system front end server uses the output responsive to the machine executable code to remotely update a display of a client device that submitted a request to present the visual representation of the prediction of the value of the profile parameter.

In some examples, the output comprises the value of the profile parameter and forensic profile data through one or more application interfaces. In some examples, processing data in the feature vector to generate a prediction comprises selecting a predictor algorithm, based on the data indicative of the one or more features with the threshold amount of confidence, for processing the data in each of the subset of the generated feature vectors. In some examples, the segmentation server executes a first selected prediction algorithm on detection data processed in accordance with a second selected prediction algorithm, wherein the detection data represents two or more features having a predetermined correlation or a predetermined dependency between the two or more features, the two or more features each having a threshold amount of confidence.

In some examples, the profile parameter comprises one or more of a bio-relevant parameter, a socio-personal parameter, and an environmental parameter the bio-relevant parameter comprises one of a physical parameter, a physiological parameter, a medical parameter, or a psychological parameter. In some examples, the socio-personal parameter comprises one of a behavioral parameter, a demographic parameter, or a sociological parameter.

In some examples, the features comprise one or more micro-properties of the speech signal, the micro-properties comprising one or more of formants, pitch, hamonicity, jitter, shimmer, formant bandwidths, harmonic bandwidths, voicing onset and offset times, glottal pulse shape, pitch onset pattern, aphonicity, biphonicity, flutter, wobble, breathiness, and resonance. In some examples, the one or more features comprise a spectral feature characterizing time-frequency characteristics of the signal, the time-frequency characteristics comprising one or more of short-time Fourier transforms, segmental cepstral features and power-normalized cepstra. In some examples, the one or more features comprise a trend feature, the trend feature comprising a modulation feature, long-term formant statistics, and a formant trajectory feature. In some examples, the one or more features comprise one or more of phonetic and linguistic features, the phonetic and linguistic features comprising phoneme durations and timing patterns.

In some examples, the segmentation server further performs operations comprising generating, based on data of a feature vector of the subset, a category for the data segment associated with that feature vector; and assigning the category to a forensic profile. In some examples, the segmentation server further performs operations comprising comparing the speech signal to an additional speech signal by comparing one or more feature vectors of the subset of the generated feature vectors to one or more feature vectors of an additional subset of generated feature vectors of the additional speech signal, the additional subset comprising one or more additional feature vectors determined to have one or more features with a threshold amount of confidence.

In some examples, generating the prediction of the value comprises executing a machine learning algorithm to determine a strength of an association between the feature vector and the profile parameter. In some examples, the segmentation server further performs operations comprising determining which of the one or more features with the threshold amount of confidence in the feature vector represents a masking-invariant pattern in a segment. In some examples, the segmentation server further performs operations comprising recovering data in a segment by modifying the segment. In some examples, the value of the profile parameter is determined in real-time or near real-time based on execution of a predictive algorithm. In some examples, the segmentation server further performs operations comprising identifying a source based on the value of the profile parameter.

DETAILED DESCRIPTION

Figure 1:
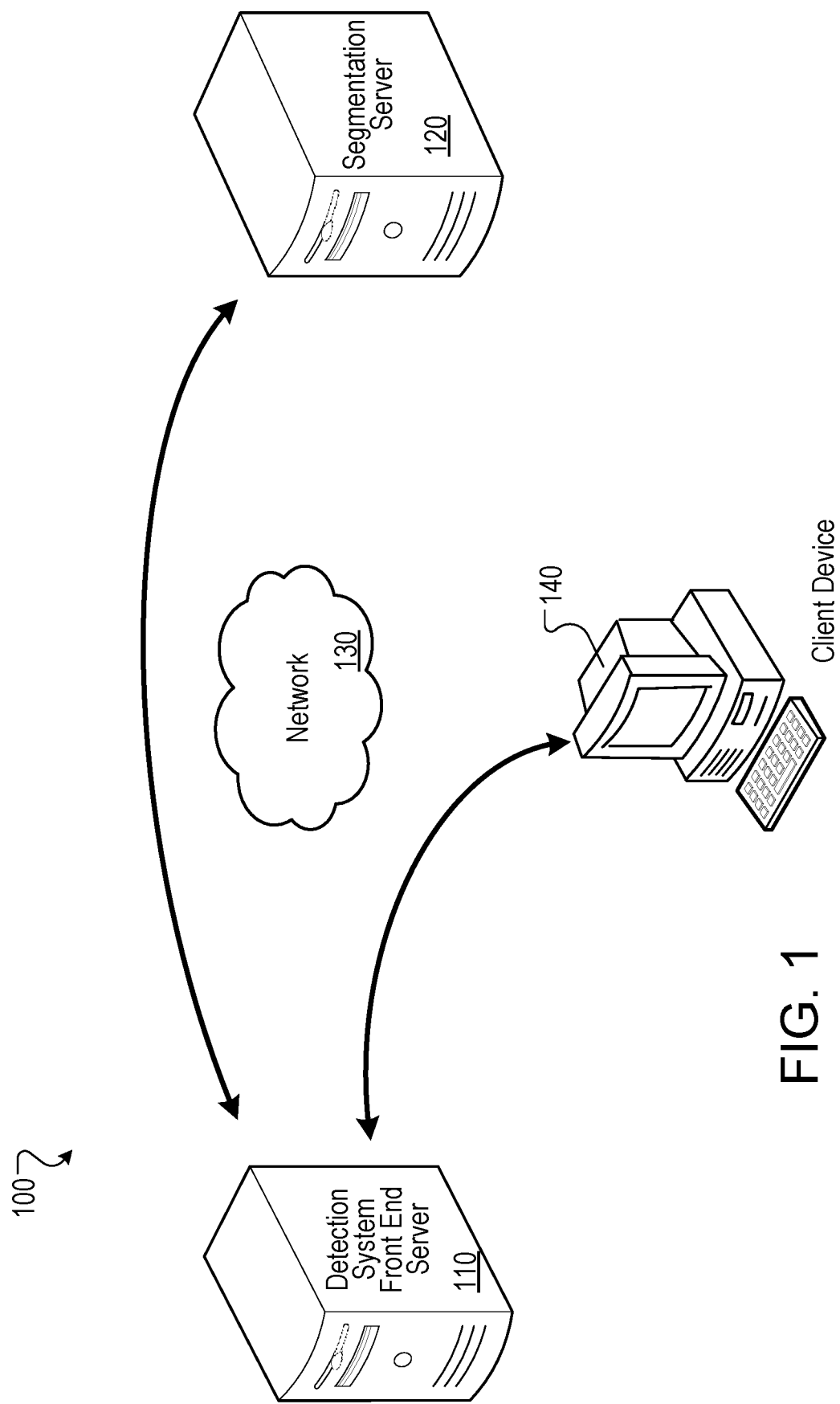
FIG. 1 shows an example diagram of a data processing system.

This document describes a system and a method for concurrently deducing various profile parameters from a speech signal. A data processing system 100 uses the various profile parameters to generate a forensic profile of the speaker and their environment. A segment of speech can be defined as a voiceprint, regardless of lexical or semantic content, or completeness. In some examples, profile parameters include a set of one or more of bio-relevant facts, such as physical, physiological, or medical facts; socio-personal facts such as behavioral, demographic, or sociological facts; and environmental facts including information about the surroundings concurrent with the speech signal production and equipment used to generate, transmit or record the speech signal. The data processing system 100 deduces the profile parameters to generate a forensic profile.

The data processing system 100 allows for forensic profiling from disguised speech signals and speech signals that are degraded or obscured. In an example, predictive mechanisms described herein can deduce the profile parameters associated with a speech signal in relation to a delayed recording, or predictive profiling.

The data processing system 100 can include a concurrent estimation of profile parameters associated with a speech signal. The concurrent estimation includes an analysis of the speech of the speech signal, as well as the non-speech portions of any speech signal to deduce the acoustic environment and instrumentation used to generate, transmit or record the speech signal.

The data processing system 100 can deduce profile parameters associated with the speech signal and represent the deduction with a prediction value for each profile parameter that is a part of the profile. In some examples, profile parameters can include one or more of bio-relevant parameters including (1) physical parameters such as height, weight, body-shape, and facial structure; (2) physiological parameters such as age, and a presence or an absence of medications; (3) medical parameters such as a presence or an absence of any particular disease(s), health parameters such as a state of physical health, a state of mental health, effects of trauma, effects of medical procedures, effects of narcotics or other intoxicants, and a presence or an absence of physical abnormalities or disabilities; (4) psychological parameters such as state of mind, duress, or intent to deceive; socio-personal parameters including (5) behavioral parameters such as dominance and leadership; (6) demographic parameters such as race, geographical origins, and a level of education; (7) sociological parameters such as social status and income; and (8) environmental parameters such as a location at the time of production of the speech signal and which objects surrounding the source of the speech signal (e.g., a speaker) at the time of production of the speech signal.

In some examples, the data processing system 100 uses subsets of standard measurements extracted from the speech signal, such as a voiceprint, to jointly estimate ensembles of profile parameters. The ensembles of profile parameters can be estimated using a combination of generative and predictive models. In some examples, the models combine information mined from predetermined judgments and the speech signal. In some examples, the ensembles of profile parameters are estimated using machine learning and statistical combination strategies in one or more modules. Algorithms of each of the modules present the use of new features which are discovered from large amounts of human-opinion data collated from crowd-sourcing mechanisms and also discovered using neural networks that can map the speech signal to opinion data.

The data processing system 100 is configured to analyze a speech signal to create the profile parameter ensemble that is a forensic profile. The data processing system 100 can detect profile parameters encoded in the speech signal as they exist at the time of production of the speech signal. In some examples, detecting the bio-relevant profile parameters encoded in the speech signal is effective for profiling as compared to DNA or fingerprints, since the latter do not necessarily reflect the bio-parametric status concurrent with the time of production of the speech signal.

In some examples, the data processing system 100 analyzes the speech signal using techniques of audio forensics. Audio forensics can be used for authentication of audio content of digital media and acoustic signature detection. In some examples, authentication can be used to detect media piracy and tampering of audio content. In some examples, signature detection can be used for surveillance, extracting evidentiary information, and identification of specific categories of sounds. For example, extracting evidentiary information can include detecting electric network frequency signatures or recognizing background recording conditions that can localize a recording geographically or in time. In some examples, specific categories of sounds can include categories such as gunshots, explosions, impacts, vehicle sounds, and the like. The data processing system 100 can use similar techniques for speech signal forensics.

Speech signal forensics can accomplish one or more profiling objectives in addition to the uses mentioned above. In some examples, the data processing system 100 can use speech signal forensics techniques such as speech signal matching for creating a forensic profile. Speech signal matching includes a comparison of one or more speech signals for identification or authentication of the source of the speech signal. In some examples, speech signal matching includes the detection or reconstruction of the original speech signal from an altered speech signal. For example, the speech signal can be reconstructed for a better identification. Alterations to a speech signal can include a signal disguise, degradation, distortion, masking, obstruction, or other alteration to the speech signal. The alterations can be performed during recording, such as using an altered microphone, muffling the speech signal, or intentionally attempting to alter or disguise a nominal speech signal. Alterations can be performed using post processing techniques on a recorded signal, such as modulating the signal or otherwise altering the signal using various signal processing techniques.

The data processing system 100 can use speech signal forensics techniques such as disputed utterance analysis (DUA) for creating a forensic profile. DUA can be used to correctly discern the semantic content of a message represented in a speech signal. In some examples, the semantic content is recognized as forensic evidence and supported by speech signal-matching only if necessary. In some examples, DUA is used when a source of the speech signal is not under dispute, but the speech signal in evidence is not clear or reliably intelligible.

The data processing system 100 can use speech signal forensics purposes such as speech signal-based lie detection for creating a forensic profile. Speech signal-based lie detection can be used to analyze measurable characteristics of a speech signal to detect whether the semantic content is likely to be a lie or not. In one example, a speech signal stress analysis can be used during speech signal-based lie detection. Supporting technologies can be combined to achieve such analysis. For example, supporting technologies including restoring speech signal recordings to improve intelligibility (speech enhancement), analysis of authenticity of the recording and content, and determination of timing and sequence of events can be used.

The data processing system 100 is used to extract information from the speech signal for one or more profiling goals. The speech signal can be analyzed to extract and predict one or more biomarkers present in the speech signal which can be quantified using profile parameter values. In some examples, a medical condition for the forensic profile can be determined from the speech signal. The medical conditions can include allergies, Schizophrenia, Autism, Parkinson's disease, Huntington's disease, psychiatric disorders such as mania, depression, and other such medical conditions. In some examples, the data processing system 100 is used to extract information relating to physical parameters such as race, age, height, weight, body size, gender (even in disguise), general indicators of physiology, and the shape of the vocal tract. The data processing system 100 can be used to extract and identify information from the speech signal relating to the source's emotional state. The data processing system 100 can be used to extract and identify information in the speech signal relating to socially relevant traits of the source and features of the speech signal. For example, information relating to dominance and attractiveness, threat potential, social status, native language, sexual orientation, level of self-consciousness, and the like can be extracted and identified by the data processing system 100. In some examples, the data processing system 100 is used to identify and extract information from the speech signal relating to other medically relevant factors of the source. The other medically relevant factors can include the presence of diseases in the source, hormone levels, and use of prescription medication, drugs, alcohol, or other such substances.

The data processing system 100 performs an analysis on a received speech signal by taking various signal measurements of the speech signal to determine what the characteristics are of the speech signal for later prediction of profile parameter values. In some examples, measurements of the speech signal that have been found to be useful include fundamental frequency (e.g., pitch), voice onset times, long-term average spectra, formant frequencies and format frequency characteristics, formant trajectories, long-term formant distributions (LTF), formant frequency dispersion, vowel formant frequency, high-range spectral energy, output-cost ratio, level of masking, dynamic pattern flows, voice quality in sustained vowels, spectra of nasal phonemes, prosody, visual markers, vocal range, vowel height, voice quality, chaotic properties, temporal dynamics, suprasegmental properties, rate and duration of speech sounds, rhythm and melody, temporal resolution, level of vocal tract control, articulatory dynamics, tracers of native language, levels of resonance, vocal intensity, and other such measurements of the speech signal.

In some examples, features of the speech signal are used for voice-pattern recognition tasks, such a speech recognition or source recognition. For example, in algorithms that seek to automatically transcribe a speech signal, such as automatic speech recognition, the features of the speech signal that are used can include Mel-frequency cepstral coefficients, power-normalized cepstral coefficients, modulation features, glottal features such as jitter, shimmer, and the like, segmental cepstral features of fricatives and vowels, and other similar features.

In addition to taking such measurements of the speech signal, the data processing system 100 can take higher level measurements. In some examples, the higher level measurements include a measure of the manner in which phonemes are enunciated, a speaking style, a cadence, a prosody of the voice in the speech signal, and so forth.

The measurements taken by the data processing system 100 are selected such that a complete set of information that is needed for a particular profiling goal is extracted from the speech signal and analyzed for creating a forensic profile from the speech signal. The data processing system 100 selects measurements to perform on the speech signal for profiling an unknown source independently from the availability of previously collected voiceprints and speech signals known to be associated with the source of the speech signal.

In some examples, the data processing system 100 can extract information from the speech signal to predict values of profile parameters using a speech signal recorded or otherwise collected in an unknown setting or environment, such as a setting that is not a clinical or controlled settings. In some examples, the data processing system 100 can use information including the speech signals of a number of subjects ranging from a few (tens) to hundreds for increasing the accuracy of profile parameter value predictions. In some examples, the data processing system 100 is built on statistical ensembles of data, involving different statistical machine learning mechanisms for automation.

In some examples, the data processing system 100 uses explicit quantitative mappings derived or learned from both generative and predictive models in combination with predetermined judgements for joint objective measurements and predictions. The data processing system 100 incorporates the joint quantitative predictions of the profile parameter value ensembles that comprise the forensic profile.

The data processing system 100 can handle profiling from speech signals recorded from disguised speech signals. People may attempt to modify the speech signal at the source or conceal the true characteristics of the speech signal in other ways before the intended recipient receives the speech signal. There are certain micro-properties and features that are invariants in a speech signal, much like DNA and fingerprints, which are involuntary and cannot be changed at will. The invariant features are entrenched in the speech signal and can include signal-level features such as long-term formant trajectory patterns, harmonic bandwidths, formant bandwidths, voicing onset and offset times, pitch onset pattern, etc.; structural features such as aphonicity, biphonicity, flutter, breathiness, wobble, resonance, pulsing, roughness, etc.; and other features that cannot be changed by muffling or masking at source. The data processing system 100 can uncover and exploit these masking-invariant patterns the use of inversion mechanisms that take advantage of measurements from the speech signal that are invariant to such attempts at speech signal-disguise for profiling purposes.

The data processing system 100 can handle profiling from speech signals that are degraded or obscured by environmental and channel effects. A speech signal can be degraded or modified in different ways by the devices used to transmit or record them. For example, a speech signal could be altered using a modulator that is mechanical or that uses software. The transmission of a speech signal can degrade the speech signal as noise and signal attenuation are introduced. The compression of a speech signal can degrade the speech signal as some micro-properties are removed or altered. The data processing system 100 includes using filtering, such as linear or non-linear filters, or compensatory mechanisms or methodologies, such as signal separation, spectral mask estimation and reconstruction, etc. to restore lost information, or profile in the presence of these modifications.

The data processing system 100 can handle predictive profiling. A speech signal can be presented for profiling at times that may often be significantly delayed from the time of speaking or recording. The data processing system 100 includes the use of predictive mechanisms and methodologies such as transformation techniques that model the spectral and structural characteristics of aging in voice, to deduce the profile parameters at the current time given the results of voiceprint inversion as relate to the time of the recording.

An element included in more than one figure has the same numerical reference in each figure in which the element has a numerical reference.

FIG. 1 shows an example diagram of a data processing system 100 for processing a speech signal. A detection system front end server 110 is used to collect a speech signal from a source of the speech signal. The detection system front end server 110 routes the speech signal to a processing device for analysis of the speech signal. The routing can be done, for example, over a network 130. A segmentation server 120 includes a processing device for analysis of the speech signal. The segmentation server 120 is configured to provide an output, such as data to update the forensic profile based on the one or more predicted profile parameter values, as a response to receiving the speech signal. The output provided by the segmentation server 120 can be used to generate a visual representation of part or all of the forensic profile, such as one or more predictions of the profile parameters. The visual representation can be displayed, for example, on a client device.

The detection system front end server 110 is a computing device for receiving or collecting the speech signal. The detection system can include one or more detection system front end servers 110 for the speech signal collection or reception. The speech signal can be recorded by a sensor such as a microphone and sent to a detection system front end server 110 of the detection system. The sensor can be remote from detection system and can send the speech signal to the detection system over a network 130. The sensor can be local to the detection system.

The speech signal can be routed from the detection system to the segmentation server 120 when the speech signal is received. Processing the speech signal immediately upon reception increases signal fidelity upon analysis by the segmentation server 120 and avoids the introduction of signal losses and signal attenuation that can be introduced during signal transmission or storage. In some examples, the speech signal can be collected and stored in a database 260 for later processing. In some examples, information associated with how the signal was encoded, stored, compressed, or otherwise altered by the data processing system 100 prior to signal analysis by the segmentation server 120 is preserved. The alteration information can be used during analysis by the segmentation server 120 to increase the accuracy of the profile parameter prediction values.

Figure 2:
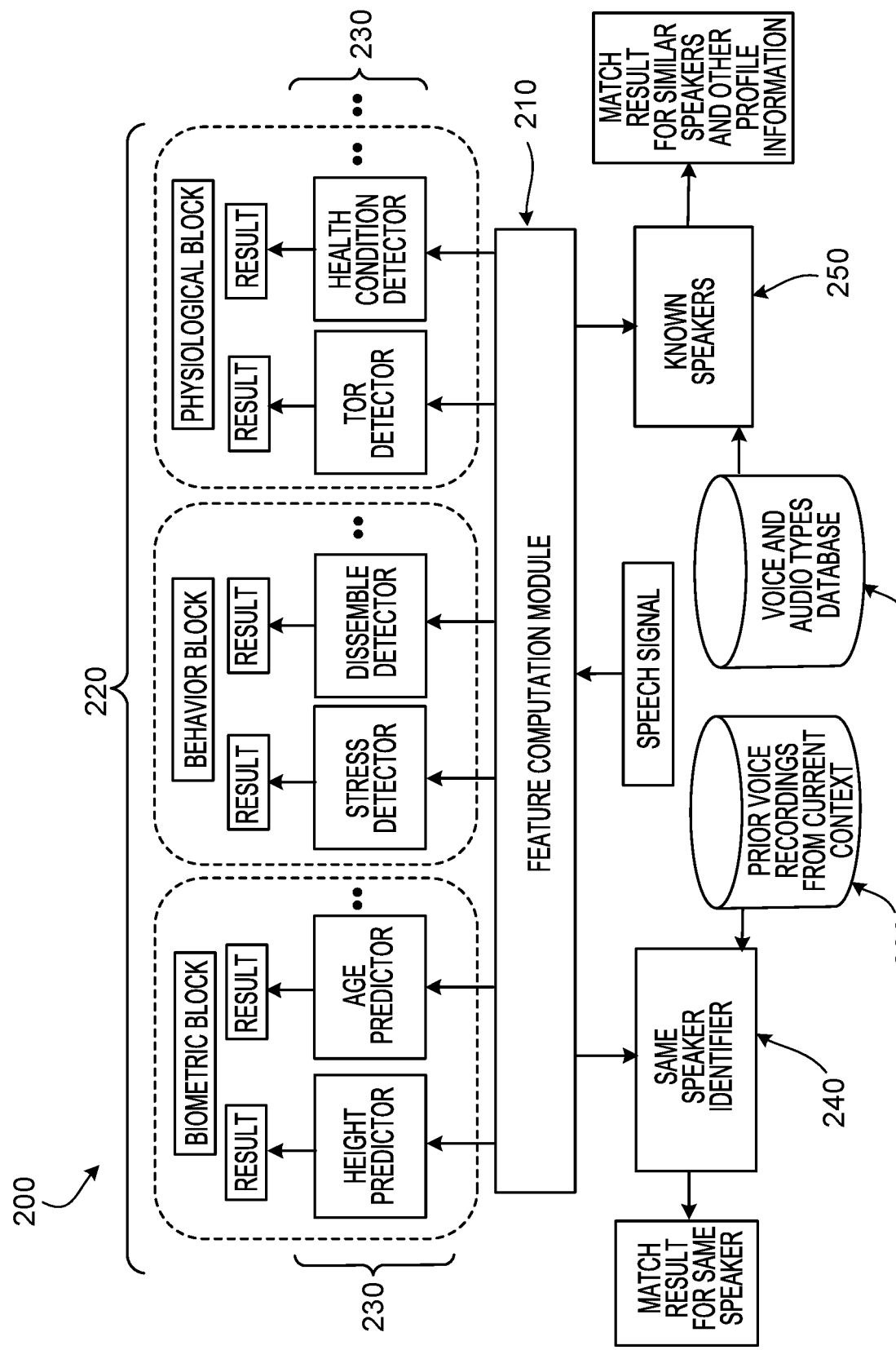
FIG. 2 shows an example diagram of a segmentation server.

FIG. 2 shows an example diagram 200 of the segmentation server 120 in the data processing system 100. The segmentation server 120 is configured to receive the speech signal and associated metadata, if necessary. The segmentation server 120 is configured to process the received speech signal by segmenting the data in the speech signal into segments that are suitable for processing by one or more blocks of the segmentation server 120. The received speech signal is segmented in multiple ways. Segment durations are based on physical principles of articulation for the production of speech, and need not be uniform. A feature computation module 210 in the segmentation server 120 identifies features that are present in each segment of the speech signal. Data representing a feature vector is generated for each segment. The data of the feature vector indicates what features are determined to exist in the segment for processing by the analysis blocks 220. The determination can be expressed using a confidence level. In some examples, a segment has no features that have a confidence level above a threshold set by the feature computation module 210, and the segment is not processed further by the analysis blocks 220. If a segment has one or more features in the feature vector that have a confidence level above the threshold, the segment is routed to the one or more analysis blocks 220 associated with the features. Each analysis block can receive some or all high-confidence features that are predictive of the profile parameters that it is responsible for. The analysis blocks 220 each contain one or more predictors 230. The predictors 230 use various techniques for determining a value for the one or more profile parameters associated with the predictor 230, and are described in further detail below in relation to FIG. 3.

Once the speech signal is received by the segmentation server 120, the speech signal is divided into segments for analysis. A segment is a fragment of the speech signal that is estimated by the segmentation server 120 to represent one or more micro-properties of the signal. The micro-properties can later be determined to be features for inclusion in a feature vector and for later analysis by the analysis blocks 220. The segments can have varying lengths from other segments of the speech signal and are typically a few milliseconds in length. A speech signal can be segmented in multiple ways, such that each section of the signal appears in multiple segments of varying lengths. Segments can be as short as several milliseconds but can be as long as necessary for analysis.

The feature computation module 210 in the segmentation server 120 derives feature representations from the recording of the speech signal segments. The features are mathematical transformations of the recording. The derivation of the features by the feature computation module 210 can result in feature vectors that encode different types of information about the segment of the speech signal. The feature vector can consist of numbers or coefficients to represent the features in the feature vector. In some examples, the features include but are not limited to spectra, formants, pitch, harmonicity, jitter, shimmer, long-term statistics, modulation spectra, voice-onset-time, Mel-frequency cepstral coefficients, power-normalized cepstral coefficients, modulation features, glottal features, segmental cepstral features of fricatives and vowels, and other similar features. The features can include microproperties of the segment. For example, the feature can include micro-properties indicating a number of inflections that follow each other in rapid succession, indicating a vocal tract having a particular, known configuration. A feature can include one or more micro-properties indicating that vocal chords accelerated from a resting position or that a junction of two sounds is present in the segment. A micro-property of the signal can occur over a period of microseconds where changes in the signal are present. Each micro-property can require a different specialized algorithm for detection and analysis. For example, a structured prediction model can be used to predict voicing onset time.

Once features have been identified from a speech segment, the feature computation module 210 generates a feature vector. The feature vector can include numbers representing the features in the feature vector. The features in the feature vector are compared to one or more thresholds for that feature in the vector. The thresholds are set based on a measure of confidence that the derived features are actually present in the segment of the speech signal. For example, certain features, such as pitch, are easier to detect and measure in the speech signal than other features, such as formant features. The confidence for a feature that is easy to detect, and thus more certainly valid, can be different than a confidence for a feature that is difficult to measure and thus more questionably valid. If the values representing the features are above the threshold confidence level, the feature is considered valid and the data representing the feature is routed to the appropriate analysis block 220.

The segmentation server 120 routes the data representing the feature vectors having a feature with a threshold amount of confidence to an analysis block 220. Each analysis block performs a potentially separate set of analyses and may work from a pre-specified block-specific set of features. The analysis blocks 220 to which the feature vector data is routed depend on the features of the feature vector that are above the threshold confidence level, and are required by the block.

The analysis blocks 220 of the segmentation server perform specialized analysis and can be optimized to handle the data being received. For example, an analysis block directed to the bio-relevant profile parameter of age can be optimized to perform frequency analysis on a segment of the speech signal being received, rather than other signal processing analysis techniques that might not produce a useful result on the particular segment being analyzed. The algorithms for analysis can be optimized because the feature module has indicated that the segment has a threshold confidence of the feature being in the signal, and results of the specialized analyses being performed on each segment will be of higher quality.

By routing feature-vector data to analysis blocks that are prepared to process the features that have the threshold level of confidence, the throughput of the data processing system is increased and latency times for concurrent analysis are reduced. Latency is reduced because the data processing system can avoid processing each segment with all known signal processing techniques to determine prediction values for each profile parameter for each speech signal segment. Furthermore, segments having no features can be discarded entirely without any further processing. By reducing latency times, real-time or near real-time analysis of the speech signal can be performed by the data processing system. This selective processing of the speech signal by the data processing system thus permits more data to be processed using fewer processing resources.

The analysis block 220 of the segmentation server 120 is a processing module that is configured to perform specialized analysis on the speech signal segments the block receives. The blocks are associated with one or more of the profile parameters in the ensemble of profile parameters that is the forensic profile. The blocks depicted in FIG. 2 are exemplary in nature and a non-exhaustive illustration of the blocks of the segmentation server 120, as shown by dots. In some examples, the blocks can include a biometric block, a behavior block, and a physiological block, an environmental block, an acoustic block, or other blocks that are needed for producing the forensic profile. The number of analysis blocks 220 is variable and extensible in the system.

Each analysis block 220 comprises sub-modules called predictors 230 that operate upon the features derived from the speech signal. The predictor 230 generates a prediction of a value of one or more profile parameters based on the data in the feature vector. In some examples, the value is a weighting of the likelihood that the source has the associated profile characteristic of the profile parameter. For example, a high predicted value for a bio-relevant profile parameter of tallness can indicate that the source of the speech signal is certainly tall, while a lower value for a different parameter expresses a lower confidence that the source of the speech signal is also overweight. In some examples, the predictor 230 generates a specific category of information about the speech recording that is part of the forensic profile. These categories include physical characteristics of the source, details of the of environment surrounding the source, details of the communication equipment used by the source, demographic information about the source, behavioral characteristics of the source, socially relevant details about the source, a medical state of the source (physical, mental, physiological), etc.

In some examples, the analysis blocks 220 can analyze all profile parameters including bio-relevant profile parameters, socio-personal profile parameters, and environmental profile parameters using the predictors. The analysis of the environmental profile parameters can include a forensic analysis of the environment of the source, such as a recording environment of the source, ambient sounds, or other background noises or sounds in the speech signal. The environmental analysis can include information that identifies a device used to record, transmit, receive, channel, or otherwise carry, handle, or process the speech signal between the recording of the speech signal and the analysis by the analysis block. For example, the environmental analysis can include a determination such as the identification of a microphone model, mixer, computer processor, interface, or other determination about the recording environment of the source and the one or more devices that may have introduced changes to the speech signal. Analysis of the environmental profile parameters can include a determination of the time of day of the recording, geographic location of the recording, the weather or atmosphere of the recording, surrounding materials and surfaces, or other information about the environment of the recording. The environmental profile parameters can be analyzed together with the bio-relevant and socio-personal profile parameters by the analysis blocks 220 and their predictors 230.

Each predictor 230 can interpret a received speech signal segment differently that other predictors 230 depending on the context of the predictor 230 during processing of the segment. The predictors 230 include specific algorithms that use information derived from statistical ensembles of data to operate on the speech signal segment to produce decisions or predictions about the specific category of the forensic profile being generated by the analysis block 220. Similar features are grouped together. For example, an age predictor can analyze the frequency space of a segment and determine that a source is older because mid-range frequencies of the signal are muted. A height predictor can analyze the same segment and determine that the segment contains a frequency shift that indicates a larger than average vocal tract shape, which in turn may indicate a taller source.

The predictor 230 can use one or more machine learning algorithms to compute the prediction value or other category information for one or more profile parameters of the forensic profile. The algorithms for determining the predictions can be based on statistical information gathered over time from other data that has already been analyzed for other sources of speech signals in addition to seed data known to represent particular features and profile parameters. In some examples, the machine-learning algorithms can include a random forest tree predictor 230, logistic regression, neural networks, or other machine-learning algorithms.

The selective processing of the data processing system 100 as mentioned above also increases the accuracy of the predictors, which can produce better prediction values over time. The machine-learning algorithms of the predictors use statistical information gathered over time from other data that has already been analyzed for other sources of speech signals. If the machine-learning algorithms of the predictors receive better data for analysis, they will be able to more accurately make predictions on whether the speech signal segment being analyzed in indicative of a particular profile parameter.

The segmentation server 120 includes comparison modules. The comparison modules can operate on the speech signal in the event that prior speech recordings exist. Comparison modules perform statistical or deterministic comparison of features derived from the speech segments to determine if a prior recording has been obtained from the same source as the current segment. The same source identifier module 240 can be invoked when the speech signal being analyzed is known to originate from the same source as a previously identified speech signal. The known sources module 250 can be invoked when there exist prior speech signals from known sources as a reference to which the speech signal can be compared. For example, the feature vectors of two or more segments can be compared. The purpose of these comparison modules is to determine if the speech signal originated from the same source as prior speech signals that were analyzed, and also whether the speech signal carries a collection of profile parameters similar to other collections of profile parameters for other speech signals in a database 260 of speech signals.

A database 260 of speech signals can be used for one or more purposes. The database 260 can store collected speech signals for later analysis. The database 260 can store a repository of recordings of speech signals for use by the comparison modules. The database 260 can store prior speech signals and recordings from the current context (e.g., for use by the comparison module) and known speech signal and audio types as a reference (e.g., for the predictors 230).

Figure 3:
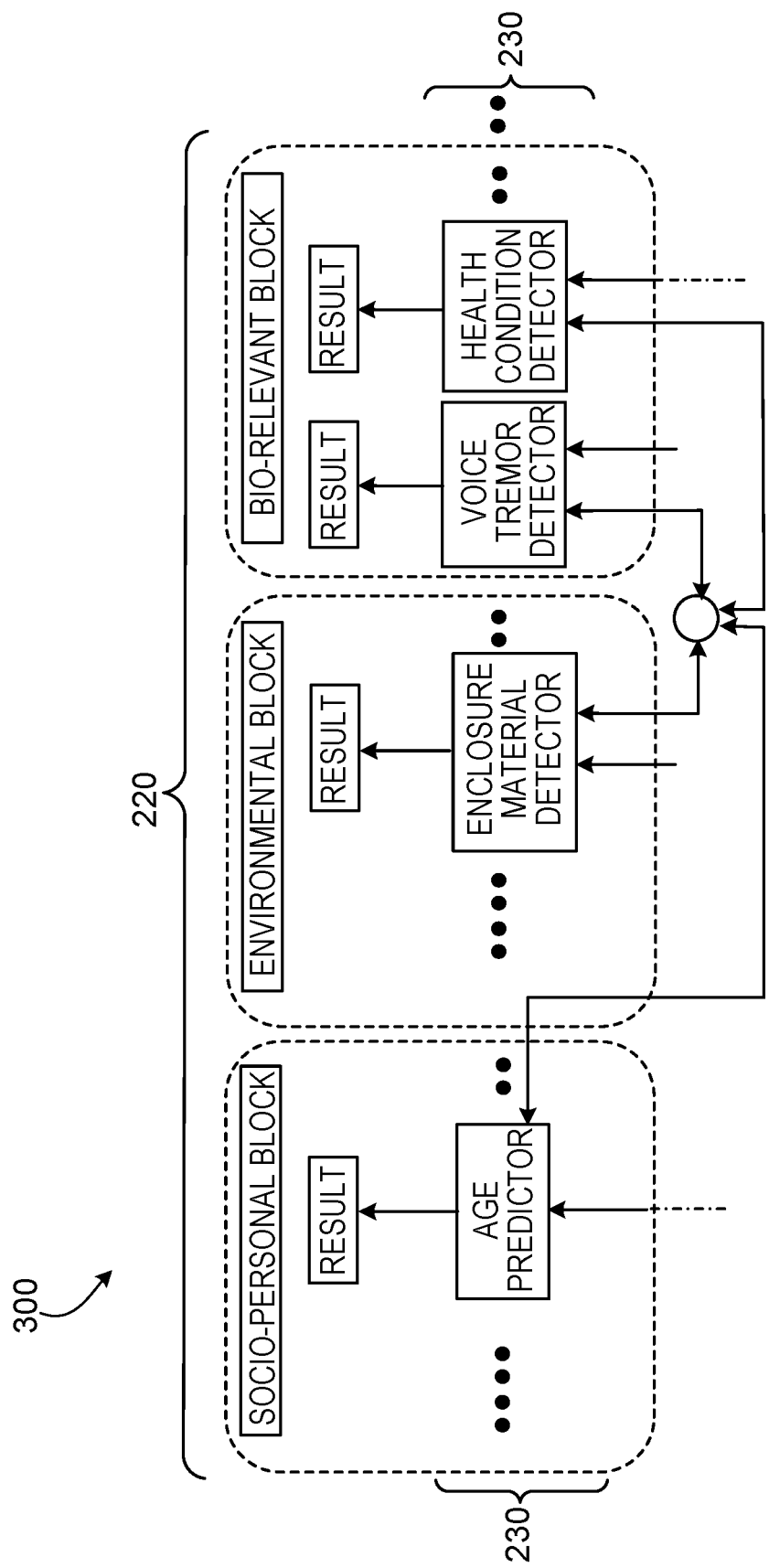
FIG. 3 shows an example diagram of data flow in the segmentation server.

FIG. 3 shows an example illustration 300 of predictors 230 within different analysis blocks 220 from FIG. 2. In some examples, the predictors 230 and comparison modules can be interconnected to predictors 230 or modules within other analysis blocks 220. Some predictors 230 use information crossover to more accurately determine a prediction of a profile parameter. Information crossover can provide a context of the result of another predictor 230 for use in another predictor 230. Since each component of the final profile may be correlated to or dependent upon a subset of other components of the profile, information can be exchanged between the predictor modules when making their decisions. For example, as shown in this figure, a tremor detected in speech signal may be due to (from left to right): the age of the source, the acoustic effects of the enclosure materials in which the speech signal was recorded, or the presence of an abnormal health condition. These correlations may influence the predictors 230 in a bidirectional manner.

The parallelized approach to processing the speech signal segments by the predictors increases throughput of the data processing system, as described above. Additionally, where sequential analysis is necessary, the structure of the analysis segmentation server 120 permits pipelining of the processing of the speech signal by the data processing system 100. The speech signal can be pipelined between the detection server 110, the feature module 210, and the one or more predictors needed to analyze features associated with a profile parameter to increase throughput of the data processing system 100. For example, once the speech signal has been segmented, the feature module 210 can generate a feature vector for the segment. When the feature module 210 finishes generating the feature vector, the analysis of the appropriate predictors 220 can occur while the feature module generates the feature vector for a subsequent speech signal segment. Pipelining can also be used between two or more predictors having data dependences on one another. Such an approach to processing can ensure that the latency experienced by the system is only increased if processing times increase at a bottleneck, wherein the bottleneck can be a processing module of the data processing system 100 that takes the longest to process the data as compared to other processing modules in the data processing system 100 in a nominal circumstance.

Figure 4:
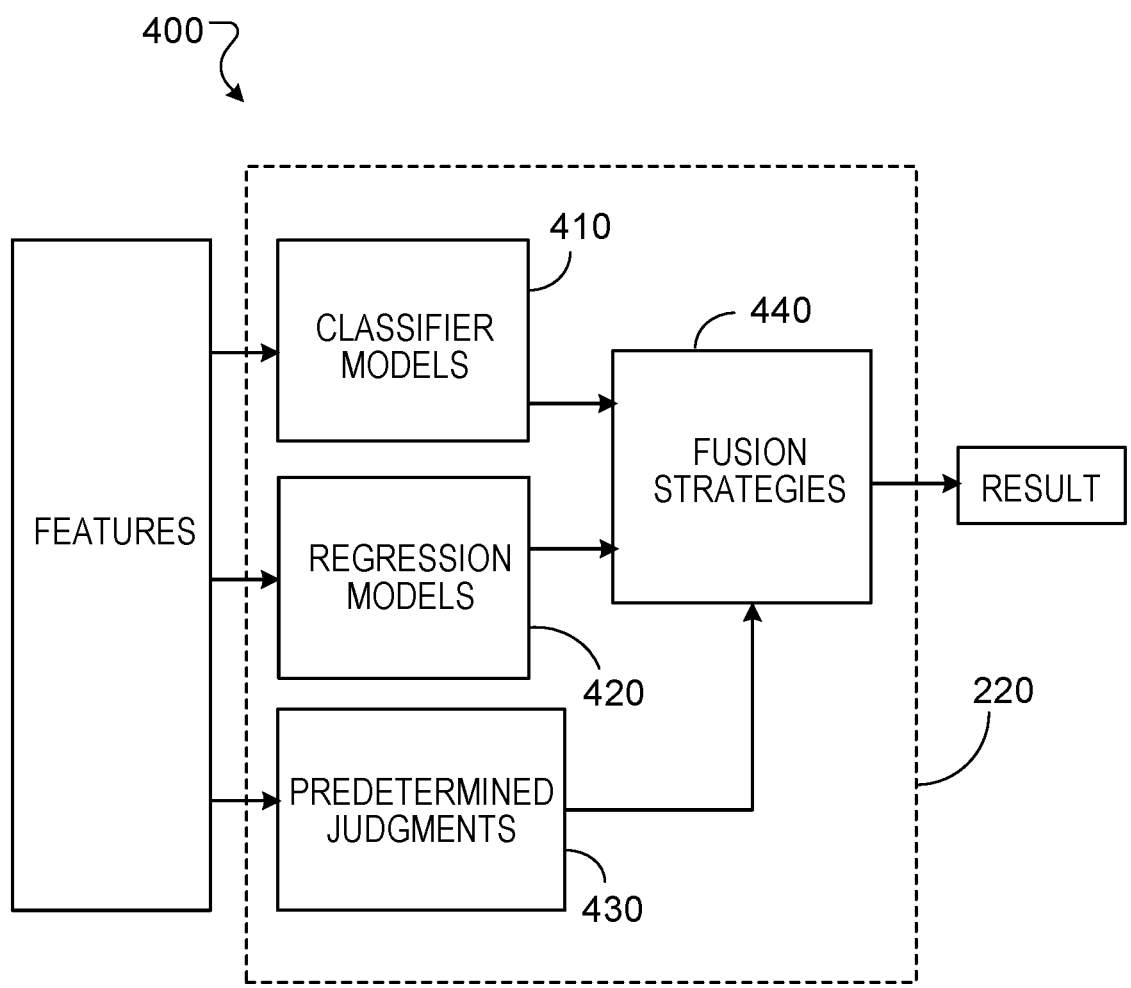
FIG. 4 shows an example diagram of a predictor module.

FIG. 4 shows an example layout 400 within a predictor module 230. Each predictor module 230 is a large collection of algorithms that combine generative (probability based), discriminative (regression based) and knowledge-based strategies (derived from mined human opinion and automatically learned features from machine learning models such as neural networks). The combination is explicitly done by using statistical combination strategies and knowledge-based AI strategies. A set of classifiers trained on statistical data ensembles can be used in one or more classifier models 410. A set of regression models 420 trained on statistical data ensembles can be used. Machine-readable representation of predetermined judgments information 430 about the parameter being deduced for profiling can be combined with the classifiers and the regression models for analysis. Fusion strategies 440 for the outputs of classifiers, regression models and predetermined judgments information are used for determining the final prediction value of the profile parameter of interest for the feature vector being analyzed.

The segmentation server 120 can output code that can generate a visual representation of the prediction values for the profile parameters. The detection system front end server 110 uses the output responsive to the machine executable code to remotely update a display of a client device that submitted a request to present the visual representation of the prediction of the value of the profile parameter. In some examples, the visual representation can be updated in real-time or near real-time as the speech signal is being collected or recorded. In some examples, the visual representation can be generated after all speech signal have been gathered.

The output can include machine-executable code that can be run by a client device or other processing device to generate the visual representation. The visual representation can include graphics such as numbers, charts, icons, graphs, histograms, text, or other graphics that can be interpreted by a user. In some examples, the visual representation can include the forensic profile including one or more categories of profile parameters associated with the profile. In some examples, the visual representation is a simple table or an unformatted string of prediction values. The visual representation can include visual associations of the speech signal to the one or more categories for the source. For example, the visual representation can show that the source is predicted to be a tall Caucasian male who suffers from Parkinson's disease and the associated likelihood that each of these predictions is accurate, either textually or graphically.

The output can include a program-returned response. For example, the output can be a part of an application programming interface (API) that is used by another system. The output of the data processing system 100 can be generated in a format for use by another data processing system. For example, the data processing system 100 can be incorporated as a module into a larger forensic analysis system. For example, the data processing system can include a software library that returns profile parameter values and forensic profiles through one or more application interfaces which can be called by an external application.

Figure 5:
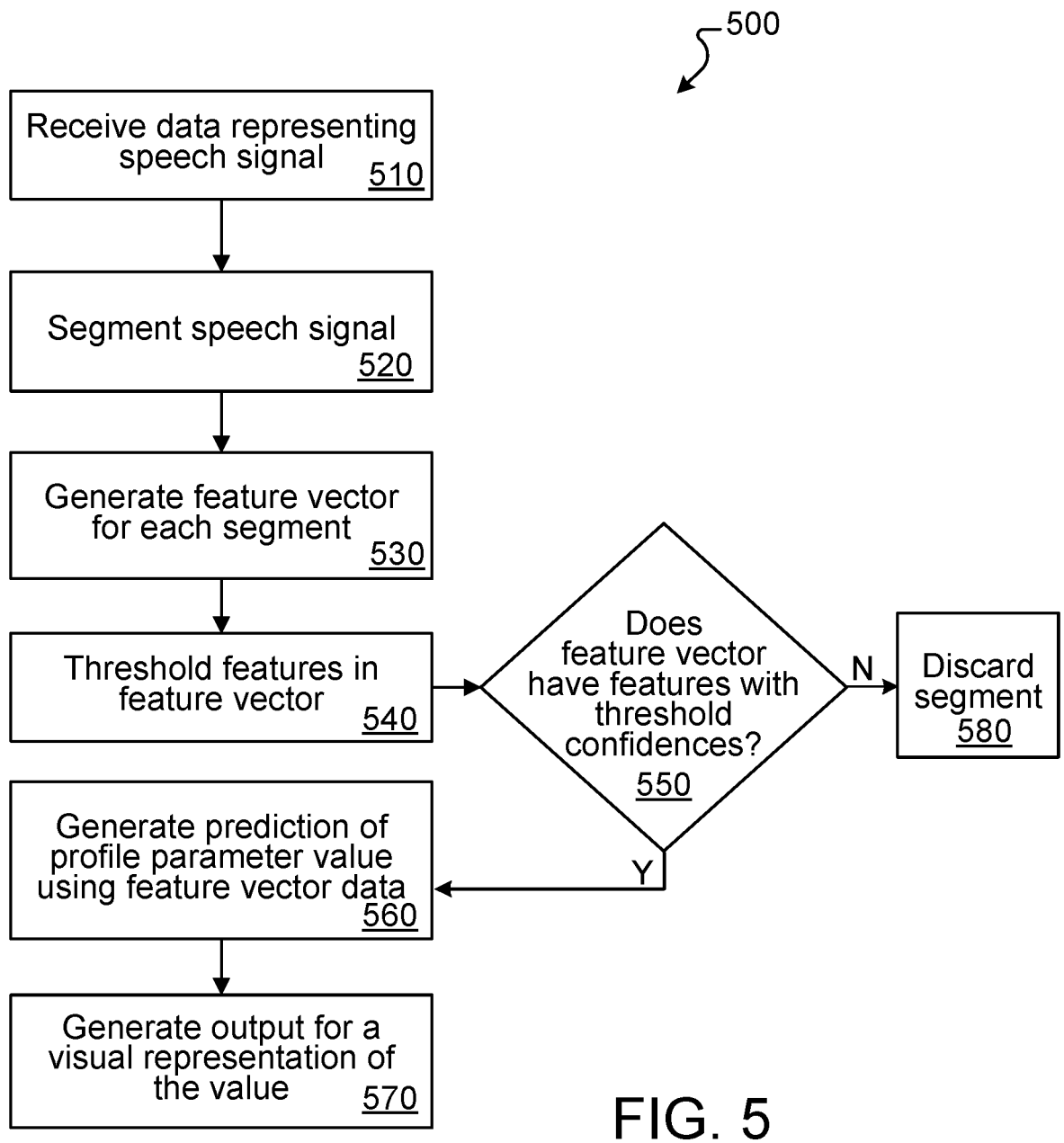
FIG. 5-6 shows examples of flow diagrams.

FIG. 5 shows a flow diagram 500 illustrating an example process for generating prediction values of profile parameters. The data processing system 100 receives the speech signal at a detection system front end server 110 at block 510. The detection system routes the speech signal to the segmentation server 120. The segmentation server 120 segments the speech signal as appropriate based on an analysis of the micro-properties of the signal at block 520. The feature computation module 210 of the segmentation server 120 generates a feature vector for each segment that has data representing the features that are present in the segment at block 530. The features of the feature vector are compared to a threshold confidence at block 540. If the features in the feature vector have a confidence above the threshold value, the feature vector is routed to the analysis blocks 220 for use by the prediction modules based on the features that are above the threshold confidence in the feature vector at block 550. The predictor modules generate prediction values for the profile properties associated with the predictor modules 230 to which the feature vector data was routed. The predictor module 230 uses machine learning techniques to determine what the value of the prediction should be for the profile parameter at block 560. The segmentation server 120 outputs data for generating a visual representation of the value at block 570. However, if the feature vector for a segment does not contain any features that have a confidence value above the threshold confidence value, the feature vector is not routed to a predictor 230 and the speech signal segment can be discarded at block 580.

Figure 6:
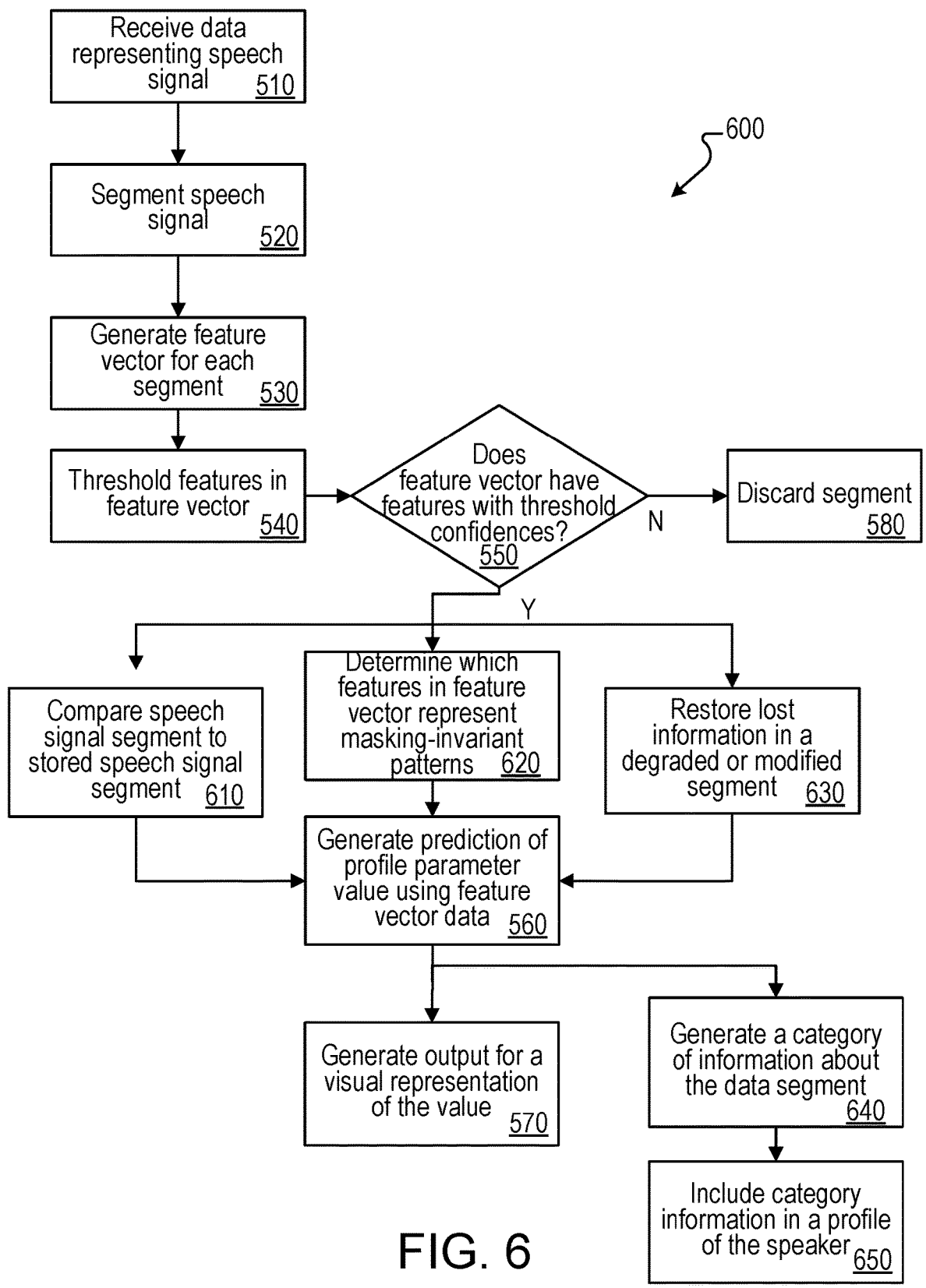

FIG. 6 shows a flow diagram 600 illustrating an example process for generating prediction values of a profile parameter. In this example, once a feature vector is determined to have features with a confidence level above the threshold, the data in the feature vector can be routed to one or more modules at blocks 610, 620, and 630 for alternative processing. For example, the segment of the speech signal can be compared to stored speech signal segments of known sources or of the same source if such samples exist in the database 260. In some examples, the speech signal can be compared to a stored speech signal segment having already been analyzed, having a known source, etc. at block 610. In some examples, the features can be analyzed to determine if the features represent masking-invariant patterns in the speech signal at block 620. If no such features are present, the predictor modules may have a lower confidence in the predictions being made for a profile parameter and could output a lower prediction value based on that information. In some examples, the feature vector or accompanying metadata can be analyzed to determine if the speech signal was modified, degraded, altered, compressed, or otherwise changed after the speech signal was recorded at block 630. This information can be used to weight predictions by the predictor modules.

In some examples, the segmentation server 120 can create a category of information about the data in the segment for inclusion in the forensic profile. This category can be based on the prediction values from the predictor modules and can represent part of the ensemble of profile parameters of the forensic profile.

Figure 7:
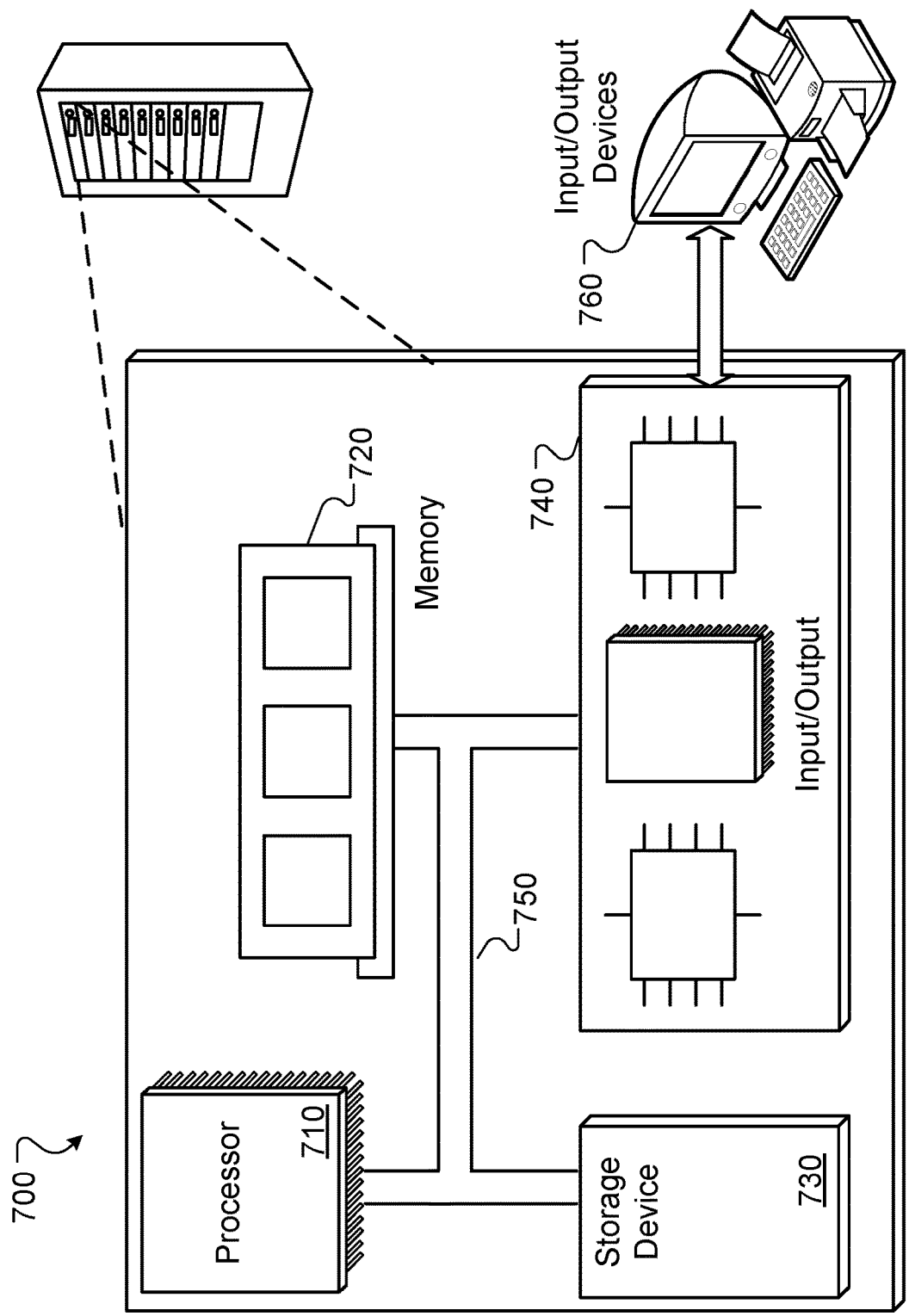
FIG. 7 shows an example diagram of a processing device system.

FIG. 7 shows an example diagram 700 of a processing device system. In some examples, the detection system front end server 110, segmentation server 120, or both can be the processing device system. The system 700 includes a processor 710, a memory 720, a storage device 730, and one or more input/output interface devices 740. Each of the components 710, 720, 730, and 740 can be interconnected, for example, using a system bus 750.

The processor 710 is capable of processing instructions for execution within the system 700. The term "execution" as used here refers to a technique in which program code causes a processor to carry out one or more processor instructions. In some examples, the processor 710 is a single-threaded processor. In some examples, the processor 710 is a multi-threaded processor. In some examples, the processor 710 is a quantum computer. The processor 710 is capable of processing instructions stored in the memory 720 or on the storage device 730. The processor 710 can execute operations such as reading input data, performing forensic analysis, and other functions described in more detail above.

The memory 720 stores information within the system 700. In some examples, the memory 720 is a computer-readable medium. In some examples, the memory 720 is a volatile memory unit. In some examples, the memory 720 is a non-volatile memory unit.

The storage device 730 is capable of providing mass storage for the system 700. In some examples, the storage device 730 is a non-transitory computer-readable medium. In various different examples, the storage device 730 can include, for example, a hard disk device, an optical disk device, a solid-state drive, a flash drive, magnetic tape, or some other large capacity storage device. The storage can include a single storage device or a number of networked storage devices. In some examples, the storage device can store long-term data, speech signals of prior recordings as seen in FIG. 2. For example, the storage device can be internet-based storage, such as cloud storage that can be owned or leased.

The input/output interface devices 740 provide input/output operations for the system 700. In some examples, the input/output interface devices 740 can include one or more of a network interface devices, e.g., an Ethernet interface, a serial communication device, and/or a wireless interface device, e.g., an 802.11 interface, a 3G wireless modem, a 4G wireless modem, etc. In some examples, the input/output device can include driver devices configured to receive input data and send output data to other input/output devices, e.g., keyboard, printer and display devices 760. In some examples, mobile computing devices such as tablets, laptops, and other mobile devices can be used. In some examples, mobile communication devices such as smart phones, smart watches, or other mobile devices can be used for the data processing system 100.

Referring to FIG. 1, operation of the segmentation server 120 can be realized by instructions that upon execution cause one or more processing devices to carry out the processes and functions described above, for example, generating the feature vector values and profile parameter prediction values. Such instructions can include, for example, interpreted instructions such as script instructions, or executable code, or other instructions stored in a computer readable medium.

In some examples, the system 700 is contained within a single integrated circuit package. A system 700 of this kind, in which both a processor 710 and one or more other components are contained within a single integrated circuit package and/or fabricated as a single integrated circuit, is sometimes called a microcontroller. In some examples, the integrated circuit package includes pins that correspond to input/output ports, e.g., that can be used to communicate signals to and from one or more of the input/output interface devices 740.

Although an example processing system has been described in FIG. 7, examples of the subject matter and the functional operations described above can be implemented in other types of digital electronic circuitry, or in computer software, firmware, or hardware, including the structures disclosed in this specification and their structural equivalents, or in combinations of one or more of them. Examples of the subject matter described in this specification, such as storing, maintaining, and displaying speech signals and other data can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, or a combination of one or more of them.

The term "system" can encompass all apparatus, devices, and machines for processing data, including by way of example a programmable processor, a computer, or multiple processors or computers. A processing system can include, in addition to hardware, code that generates a visual representation of the prediction values or forensic profiles. The processing system can be configured for internet-based computing, such as cloud-based computing. For example, the data processors for performing the analysis can be cloud-based processors that are leased or owned. A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network such as the network 130. A computer program can be written as an application for a specialized operating system or architecture.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM, DVD-ROM, and Blu-Ray disks. The processor and the memory can be supplemented by, or incorporated in, special purpose logic circuitry.

A number of examples have been described. Nevertheless, various modifications can be made without departing from the spirit and scope of the processes and techniques described herein. In addition, the processes depicted in the figures do not require the particular order shown, or sequential order, to achieve desirable results. In addition, other steps can be provided, or steps can be eliminated, from the described processes, and other components can be added to, or removed from, the described apparatus and systems. Accordingly, other embodiments are within the scope of the following claims.

What is claimed is:

1. A data processing system for processing a speech signal, the data processing system comprising:
   a detection system front end server that routes data representing a speech signal to one or more processing devices that generate a response to the speech signal; and
   a segmentation server that includes the one or more processing devices and that processes the speech signal to segment the data into a plurality of segments, with each segment representing a portion of the speech signal, and with the segmentation server further performing operations comprising:
   for each segment,
      generating a feature vector comprising data indicative of one or more features of the portion of the speech signal represented by that segment;
      determining confidence values for the one or more features of the feature vector; and
      comparing the confidence values for the one or more features to respective threshold values;
   for each of a subset of the generated feature vectors, processing data in that feature vector to generate a prediction of a value of a profile parameter, with the subset comprising one or more feature vectors determined to have respective features that have confidence values exceeding the respective threshold values;
   wherein the segmentation server generates and transmits an output responsive to machine executable code that generates a visual representation of the prediction of the value of the profile parameter, and wherein the detection system front end server uses the output responsive to the machine executable code to remotely update a display of a client device that submitted a request to present the visual representation of the prediction of the value of the profile parameter; and
   wherein the segmentation server executes a first selected prediction algorithm on detection data processed in accordance with a second selected prediction algorithm, wherein the detection data represents two or more features having a predetermined correlation or a predetermined dependency between the two or more features, the two or more features each having respective confidence values that exceed the respective threshold values.

2. The data processing system of claim 1, wherein the output comprises the value of the profile parameter and forensic profile data through one or more application interfaces.

3. The data processing system of claim 1, wherein processing data in the feature vector to generate a prediction comprises selecting a predictor algorithm, based on the data indicative of the one or more features with the confidence value that exceeds the respective threshold, for processing the data in each of the subset of the generated feature vectors.

4. The data processing system of claim 1, wherein the profile parameter comprises one or more of a bio-relevant parameter, a socio-personal parameter, and an environmental parameter.

5. The data processing system of claim 4, wherein the bio-relevant parameter comprises one of a physical parameter, a physiological parameter, a medical parameter, or a psychological parameter.

6. The data processing system of claim 4, wherein the socio-personal parameter comprises one of a behavioral parameter, a demographic parameter, or a sociological parameter.

7. The data processing system of claim 1, wherein one or more features comprise one or more micro-properties of the speech signal, the micro-properties comprising one or more of formants, pitch, hamonicity, jitter, shimmer, formant bandwidths, harmonic bandwidths, voicing onset and offset times, glottal pulse shape, pitch onset pattern, aphonicity, biphonicity, flutter, wobble, breathiness, and resonance.

8. The data processing system of claim 1, wherein the one or more features comprise a spectral feature characterizing time-frequency characteristics of the signal, the time-frequency characteristics comprising one or more of short-time Fourier transforms, segmental cepstral features and power-normalized cepstra.

9. The data processing system of claim 1, wherein the one or more features comprise a trend feature, the trend feature comprising a modulation feature, long-term formant statistics, and a formant trajectory feature.

10. The data processing system of claim 1, wherein the one or more features comprise one or more of phonetic and linguistic features, the phonetic and linguistic features comprising phoneme durations and timing patterns.

11. The data processing system of claim 1, the segmentation server further performing operations comprising:
generating, based on data of a feature vector of the subset, a category for the data segment associated with that feature vector; and
assigning the category to a forensic profile.

12. The data processing system of claim 1, the segmentation server further performing operations comprising:
comparing the speech signal to an additional speech signal by comparing one or more feature vectors of the subset of the generated feature vectors to one or more feature vectors of an additional subset of generated feature vectors of the additional speech signal, the additional subset comprising one or more additional feature vectors determined to have one or more features having respective confidence values that exceed the respective threshold values.

13. The data processing system of claim 1, wherein generating the prediction of the value comprises executing a machine learning algorithm to determine a strength of an association between the feature vector and the profile parameter.

14. The data processing system of claim 1, the segmentation server further performing operations comprising determining which of the one or more features having respective confidence values that exceed the respective threshold values in the feature vector represents a masking-invariant pattern in a segment.

15. The data processing system of claim 1, the segmentation server further performing operations comprising recovering data in a segment by modifying the segment.

16. The data processing system of claim 1, wherein the value of the profile parameter is determined in real-time or near real-time based on execution of a predictive algorithm.

17. The data processing system of claim 1, the segmentation server further performing operations comprising identifying a source based on the value of the profile parameter.

18. A non-transitory computer-readable medium storing software comprising instructions executable by one or more computers which, upon such execution, cause the one or more computers to perform operations comprising:
processing a speech signal to segment the speech signal into a plurality of segments, with each segment of the plurality of segments representing a portion of the speech signal;
for each segment,
generating a feature vector comprising data indicative of one or more features of the portion of the speech signal represented by that segment;
determining confidence values for the one or more features of the feature vector; and
comparing the confidence values for the one or more features to respective threshold values;
for each of a subset of the generated feature vectors, processing data in that feature vector to generate a prediction of a value of a profile parameter, with the subset comprising one or more feature vectors determined to have respective features that have confidence values exceeding the respective threshold values; and
generating an output responsive to machine executable code as a program-returned response including the prediction of the value of the profile parameter; and
executing a first selected prediction algorithm on detection data processed in accordance with a second selected prediction algorithm, wherein the detection data represents two or more features having a predetermined correlation or a predetermined dependency between the two or more features, the two or more features each having respective confidence values that exceed the respective threshold values.

* * * * *